United States Patent [19]

Kim et al.

[11] Patent Number: 5,663,855
[45] Date of Patent: Sep. 2, 1997

[54] MAGNETIC LATCHING APPARATUS FOR AN ACTUATOR OF A HARD DISK DRIVE

[75] Inventors: Sung-Wook Kim; Yun-Chong Hwang, both of Seoul, Rep. of Korea

[73] Assignee: SamSung Electronics Co., Ltd., Suwon, Rep. of Korea

[21] Appl. No.: 649,435

[22] Filed: May 17, 1996

Related U.S. Application Data

[63] Continuation-in-part of Ser. No. 434,310, May 2, 1995, Pat. No. 5,583,724.

[30] Foreign Application Priority Data

Oct. 17, 1994 [KR] Rep. of Korea .................. 26495/1994

[51] Int. Cl.$^6$ .................................................. G11B 21/22
[52] U.S. Cl. .................................................. 360/105
[58] Field of Search .................................................. 360/105

[56] References Cited

U.S. PATENT DOCUMENTS

| | | | |
|---|---|---|---|
| 5,003,422 | 3/1991 | Sun et al. | 360/105 |
| 5,023,736 | 6/1991 | Kelsic et al. | 360/105 |
| 5,189,576 | 2/1993 | Morehouse et al. | 360/105 |
| 5,224,000 | 6/1993 | Casey et al. | 360/105 |
| 5,231,556 | 7/1993 | Blanks | 360/105 |
| 5,270,887 | 12/1993 | Edwards et al. | 360/97.03 |
| 5,274,288 | 12/1993 | Stefansky | 360/99.08 X |
| 5,448,435 | 9/1995 | Nakazawa et al. | 360/105 |

*Primary Examiner*—John H. Wolff
*Attorney, Agent, or Firm*—Robert E. Bushnell, Esq.

[57] ABSTRACT

The invention relates to a magnetic actuator latching apparatus in a hard disk drive, for maintaining the actuator of the hard disk drive in a parking zone while the actuator is not in operation. A magnetic actuator latching apparatus of a hard disk drive comprises a latching screw installed at the voice coil end of an actuator, which is easily latched by a permanent magnet, in order that a head of the actuator is positioned in a parking zone of a disk so that data recorded on a disk can be safely protected while said hard disk drive is not in operation. The permanent magnet attracts the latching screw through a magnetic force and then enables the head of the actuator to be positioned on the parking zone, upon the power-off of said hard disk drive. A damper, which houses the permanent magnet, buffers a shock or an impact resulting from being contacted with the latching screw. A latch assembly has a damper inserting part for receiving the damper and a plate extending from the damper inserting part. A lower yoke, which supports a magnet over which the voice coil of the actuator passes, has a lug extending upward to receive a lug inserting hole in the plate of the latch assembly so the latch assembly can be attached to the lower yoke. The lower yoke also has a supporting member assembly hole aligned with a supporting member passing hole of the plate of the latch assembly. A supporting member has a peg extending therefrom which is passed through the supporting member passing hole and fit into the supporting member assembly hole so that the latch assembly is fixedly attached to the lower yoke.

21 Claims, 5 Drawing Sheets

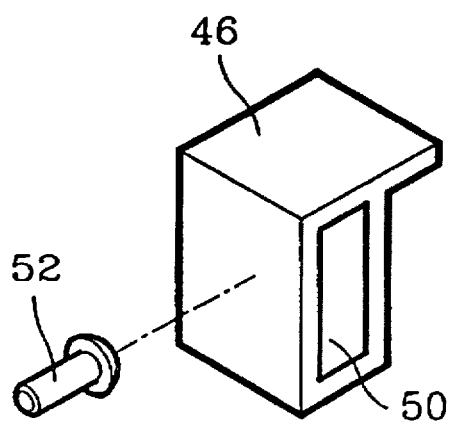 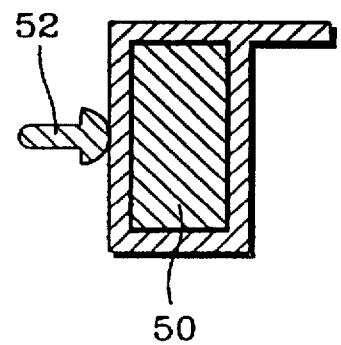
Fig. 3A          Fig. 3B
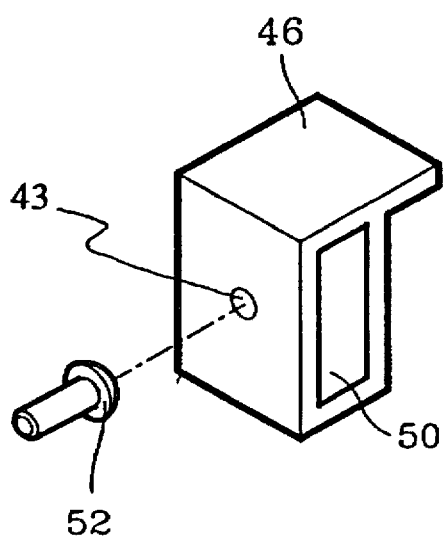 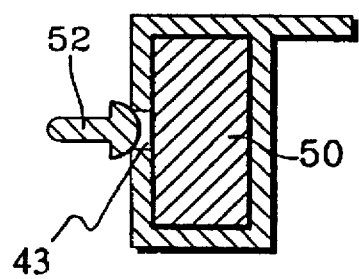
Fig. 4A          Fig. 4B

MAGNETIC LATCHING APPARATUS FOR AN ACTUATOR OF A HARD DISK DRIVE

CROSS-REFERENCE TO RELATED APPLICATIONS

This application is a continuation-in-part of U.S. application Ser. No. 08/434,310 entitled *A Magnetic Latching Apparatus For An Actuator Of A Hard Disk Drive*, filed 2 May 1995, now U.S. Pat. No. 5,583,724.

BACKGROUND OF THE INVENTION

The present invention relates to a hard disk drive used as an auxiliary memory device in a computer, and more particularly, to a magnetic latching apparatus for an actuator of the hard disk drive for maintaining the actuator of the hard disk drive in a parking zone while the actuator is not in operation.

Generally, the hard disk drive used as the auxiliary memory device in the computer includes a disk which is rotated at a high speed by a spindle motor, and an actuator which rotates in response to a voice coil motor about a pivot point for moving a magnetic head that writes data onto tracks of the disk and reads data recorded on tracks of the disk. The magnetic head is located on a leading end of a head gimbals, which moves along both sides of the disk, wherein the magnetic head is influenced by an airflow generated on a surface of the disk as the disk rotates at a high speed to maintain a minute air gap between the magnetic head and the disk.

When the hard disk drive stops or electrical power is turned off during the above-mentioned operation, the actuator is installed to move the magnetic head into a parking zone located on an inner or an outer portion in the tracks of the disk. Upon interruption of electrical power to the hard disk drive, the actuator is adjusted to move the magnetic heads into the parking zone on the disk by a residual inertia of a spindle motor. This is designed to prevent the data recorded on the disk from being damaged due to undesired contact of the magnetic head against the surface of the disk.

For stably fixing or latching a rear end of the actuator during the above operation, a device such as a solenoid, a separate voice coil motor or a magnetic latch has been employed. Among these, the magnetic latch is generally used. In this case, a metal plate easily attached to a magnet has to be installed to the rear end of the actuator, since the rear end of the actuator is made of an aluminum material, or has a structure to which a coil may be attached. Generally, in the case where the structure having a metal plate is used, the metal plate can be attached to the rear end of the actuator by using in adhesive material. When the adhesive material is used within the hard disk drive, there are disadvantages because gas generated during the time it takes the adhesive material to solidify mad dust generated due to a change of an element of the adhesive material over time deleteriously effect the reliability of the hard disk drive.

One conventional disk drive design incorporating an electric latching technique uses a solenoid or a separate voice coil motor, thus requiring an additional device for controlling these components. This results in another problem that the cost of product is accordingly raised due to an increased price of manufacturing the device. An example of this type of design, such as U.S. Pat. No. 5,189,576 entitled *Rotary Inertial Latch For Disk Drive Actuator* to James H. Morehouse, et al., uses a mechanical latch responsive to an inertial force of the actuator for moving a latch pin to engage a finger extending from the actuator in order to maintain the actuator in its proper position when the disk drive is not in operation. There are disadvantages in using this conventional latch because a complicated device using a damper or a spring to buffer impact generated upon the parking of the head is used; consequently the cost of the product is accordingly raised, and difficulties of assembly and repair are incurred.

In another example, John B. Blanks discloses in U.S. Pat. No. 5,231,556 a *Self-Holding Latch Assembly* using a magnetic latch assembly mounted on a magnet coil assembly that rotates about a pivot pin to confine a latch pin, extending from the side of an actuator by an arm, between a latch arm of the magnetic latch assembly and a travel stop, in order to lock the actuator in a parking zone.

A somewhat different approach, found in U.S. Pat. No. 5,224,000 entitled *Crash Stop And Magnetic Latch For A Voice Coil Actuator* by Shawn E. Casey, et al., uses a magnetic latch for holding an actuator in a home or park position. The magnetic latch is constructed with a pair of magnetic "L" shaped slidable poles disposed on opposite sides of a magnet, wherein the poles are of a greater length than the magnet so that a steel strike plate attached to the actuator contacts the poles to prevent the strike plate from hitting the magnet. The magnetic latch is slidably mounted in a recess of a bumper pad disposed within a frame of a bumper stop mounted on the lower casing of the housing, with the poles extending beyond a contact surface of the bumper pad. Another magnetic latch, U.S. Pat. No. 5,023,736 entitled *Magnetic Latch For Disk Drive Actuator* by Gary Kelsic, et al., has a magnetic latch having a pair of spaced apart parallel poles extending from a magnet for latching onto a latch plate extending from a disk drive actuator for maintaining the actuator in a crash stop, or parked position when desired. The magnetic latch is housed in a cavity formed in a molded plastic housing attached to the disk drive housing. Kai C. K. Sun, et al., in U.S. Pat. No. 5,003,422 entitled a *Magnetic Locking Mechanism*, shows a magnetic latch, having a resilient mechanism connected to a support structure for dampening the impact of the actuator as an actuator pin extending from the actuator strikes a swing plate of the resilient mechanism. Movement of the swing plate causes the top of the swing plate to move against the resistance of a spring in response to the bottom of the swing plate being struck by the actuator. A magnet attached to the bottom of the swing plate latches onto an actuator pin extending from the actuator when the actuator is placed in park.

While these designs provide a modicum of improvement in their own right, their tendency towards bulkiness hinders efforts to further miniaturize the volume occupied a disk drive.

SUMMARY OF THE INVENTION

It is an object of the present invention to provide an improved latch mechanism for a hard disk drive.

It is also an object to provide an actuator latching apparatus of a hard disk drive which does not require an adhesive material in order for the latching apparatus to be installed in the hard disk drive in an assembly that is free of adhesive materials containing volatile components.

It is another object to provide an actuator latching apparatus of a hard disk drive that can be constructed in a simple assembly operation.

It is yet another object to provide a reliable actuator latch that accomodates miniaturization of the disk drive.

It is still another object to provide a reliable actuator latch that may be easily assembled from a minimum number of parts.

To attain these and other objects, a hard disk drive constructed according to the principles of the present invention provides a permanent magnet, which is used for latching a latching screw attached to the voice coil end of the actuator in the hard disk drive, is assembled in a latch assembly, the permanent magnet being covered with a damping material made of a resilient material such as rubber. The latching screw is mounted in a threaded groove formed in a part of the voice coil end of the actuator.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 3A is a perspective view illustrating the spatial relation between a damper and a latching screw according to the first embodiment;

FIG. 3B is a cross-sectional view illustrating a latched relation between the damper and latching screw according to the first embodiment;

FIG. 4A is a perspective view illustrating the spacial relation between a damper and a latching screw according to the second embodiment;

FIG. 4B is a cross-sectional view illustrating a latched relation between the damper and latching screw according to the second embodiment;

DETAILED DESCRIPTION OF THE PREFERRED EMBODIMENT

Figure 6:
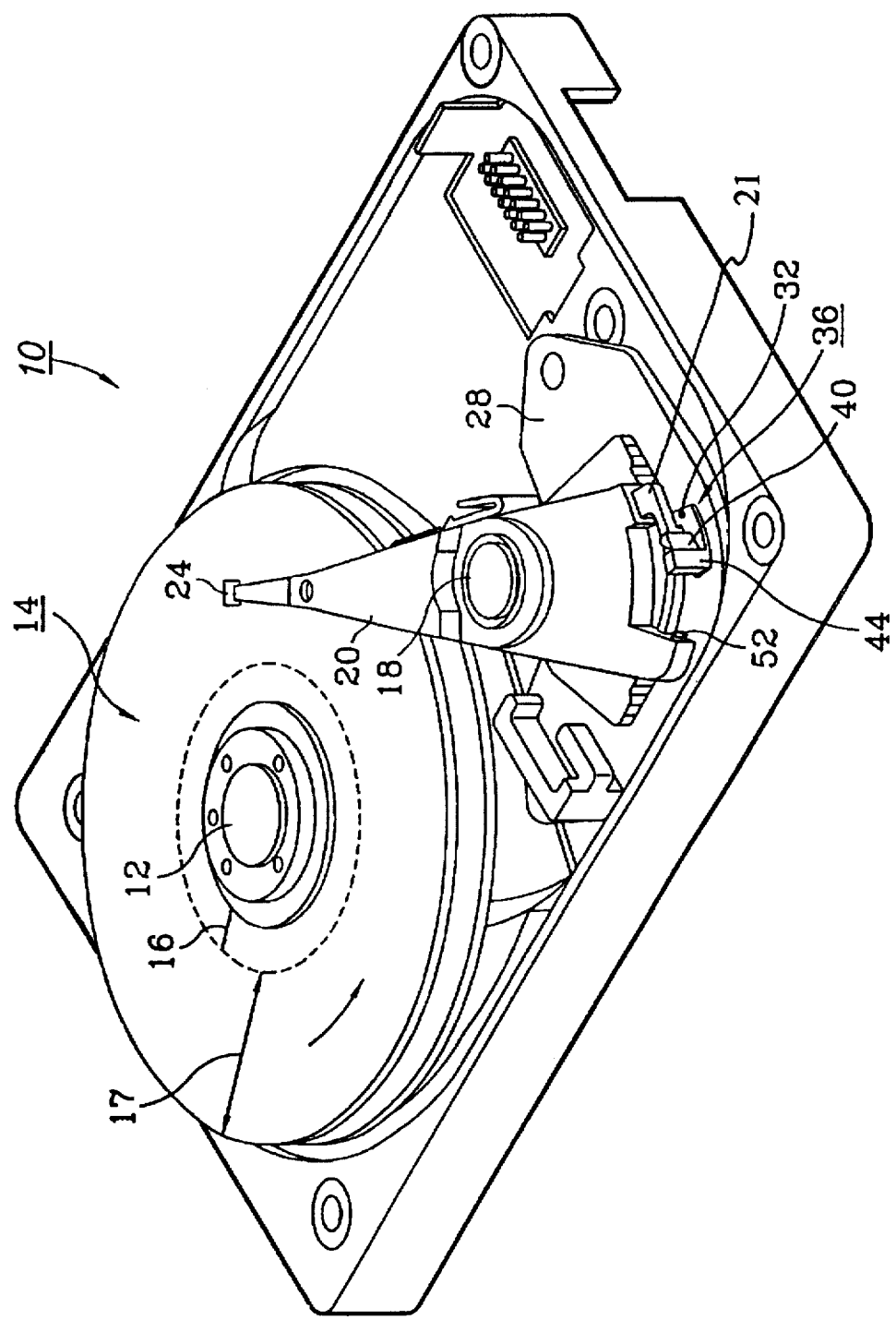
FIG. 6 is a assembled perspective view illustrating assembly of the magnetic actuator latching apparatus in the hard disk drive constructed according to the principles of the present invention.

A hard disk drive in the present invention, as shown in FIG. 6, includes a disk 14 that rotates at a high speed by a spindle motor 12 placed in a central portion thereof. An actuator 20 is rotatably installed about a pivot 18, above a surface of disk 14, and head gimbals having a magnetic head 24 are provided at the head end of the actuator 20. Disk 14 includes a data zone 17 where data is recorded or read, and a parking zone 16 where magnetic head 24 is safely positioned while hard disk drive is not in operation. A bobbin and a coil combination, which constitute a voice coil motor 21, are provided at the voice coil end of the actuator 20.

Figure 1:
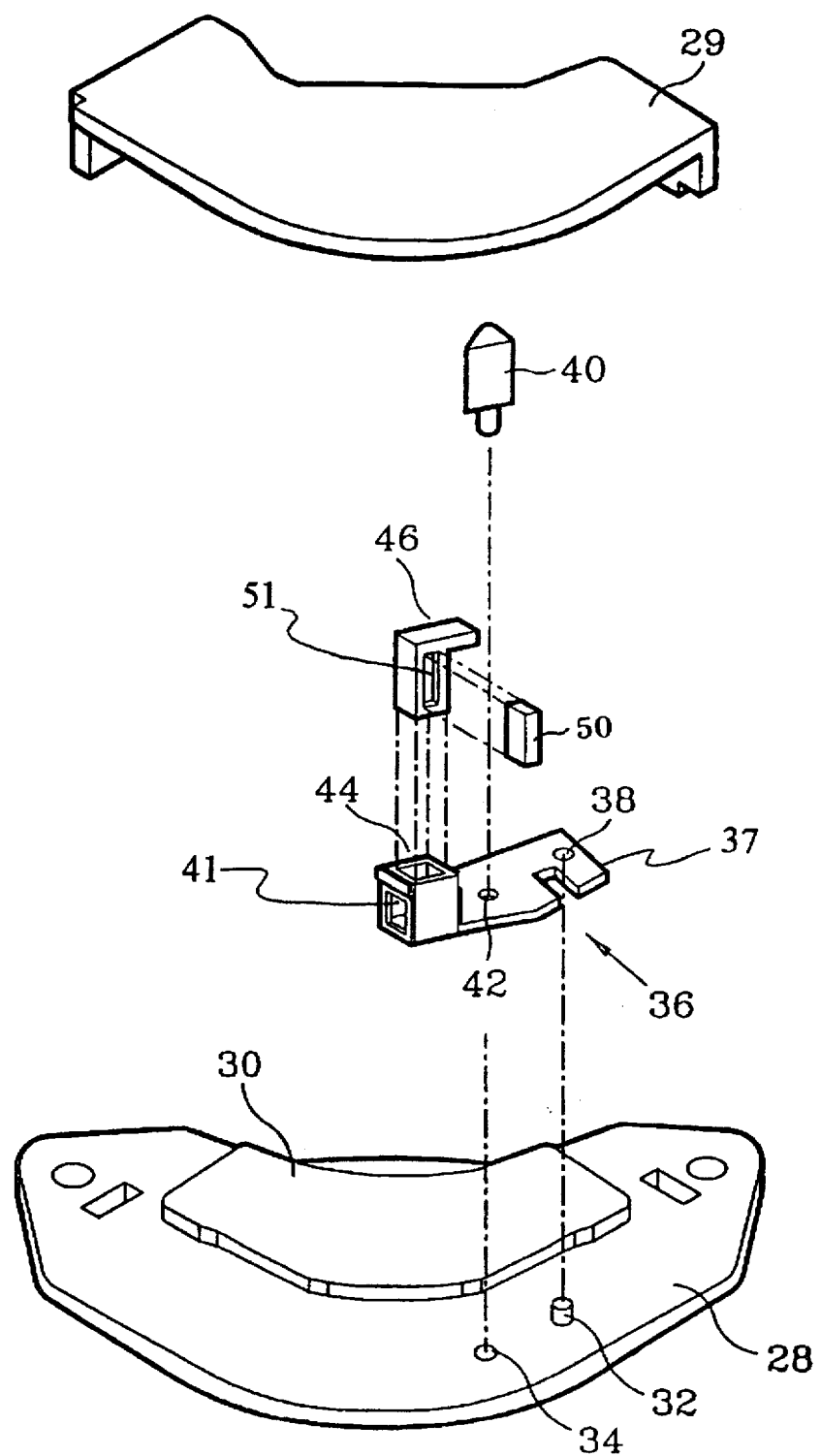
FIG. 1 is an exploded perspective view illustrating a first embodiment of a magnetic actuator latching apparatus in a hard disk drive constructed according to the principles of the present invention.

Additionally, voice coil motor 21 moves between a lower yoke 28, FIG. 1, having a permanent magnet 30 mounted thereon, and an upper yoke 29 also having a permanent magnet (not shown) mounted thereon, which are separated by a given distance to each other. Lower yoke 28 is attached to the lower body portion of the hard disk drive.

Figure 5:
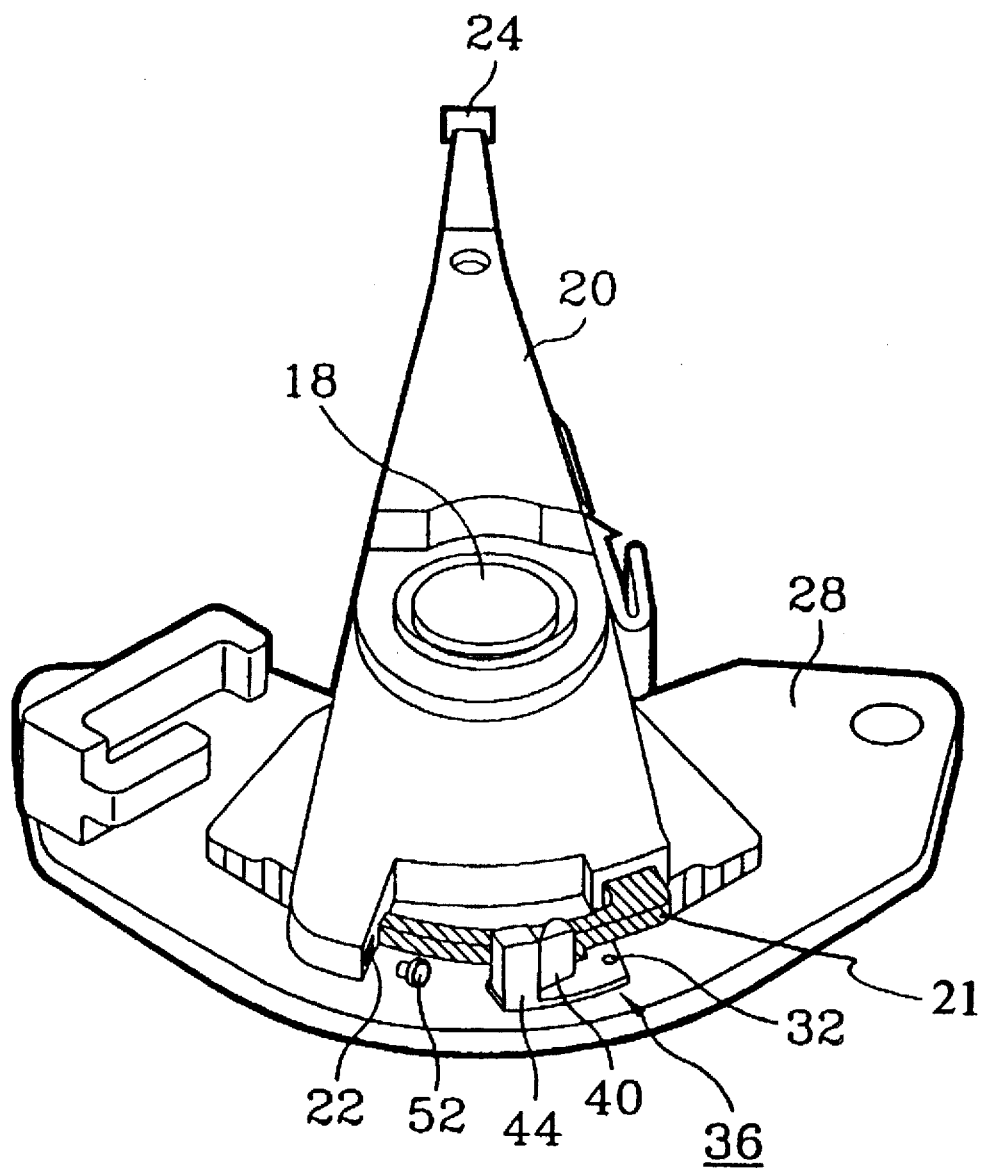
FIG. 5 is a perspective view illustrating a latching screw and its assembly to the actuator in relation to the mounted magnetic actuator latching apparatus constructed according to the principles of the present invention.

Further, as shown in FIG. 5, a portion of the voice coil end of actuator 20 which houses voice coil motor 21 is removed to leave a portion of voice coil motor 21 exposed. The most rearward portion of the remaining portion of the voice coil end of actuator 20 which houses voice coil motor 21 has a threaded groove 22 formed in a side thereof. Latching screw 52 is assembled in threaded groove 22 in the voice coil end of actuator 20. Latching screw 52 is easily latched by latch assembly 36 when head 24 is moved to parking zone 16.

Latching screw 52 is comprised of two ends having different size with each other. The small end forms a male screw thread to be received by threaded groove 22. It should be understood, however, that latching screw 52 could instead be, for example, a rivet riveted to the voice coil end of actuator 20.

In the first embodiment, as in shown in FIG. 1, latch assembly 36, which attracts latching screw 52 through a magnetic force and thus enables magnetic head 24 of actuator 20 to be positioned on parking zone 16 upon de-energization of hard disk drive 10, has a "L" shape. Latch assembly 36 comprises a damper inserting part 44 having a boxed shape, which has an upper opening at an upper portion thereof, provided at one side of latch assembly 36, to receive a damper 46 having an elongated slot 51 therein in which permanent magnet 50 is to be inserted. A side of damper inserting part 44 includes a side opening 41 through which latching screw 52 can be contacted with damper 46.

Figure 2:
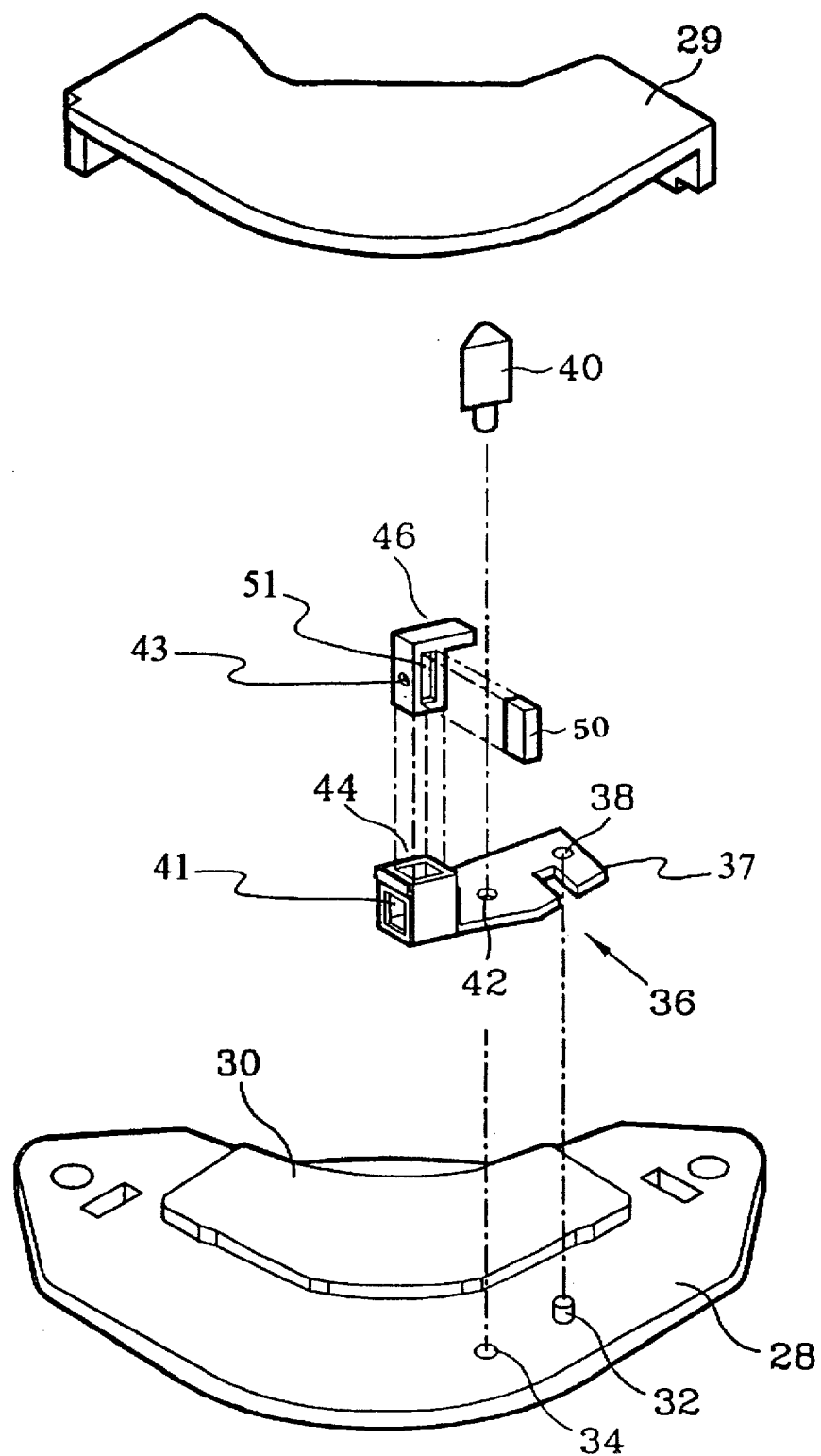
FIG. 2 is an exploded perspective view illustrating a second embodiment of a magnetic actuator latching apparatus in a hard disk drive constructed according to the principles of the present invention.

In a second embodiment, as shown in FIG. 2, latch assembly 36, which attracts latching screw 52 through a magnetic force and thus enables magnetic head 24 of actuator 20 to be positioned on parking zone 16 upon de-energization of hard disk drive 10, has a "L" shape. Latch assembly 36 comprises a damper inserting part 44 having a boxed shape, which has an upper opening at an upper portion thereof, provided at one side of latch assembly 36, to receive a damper 46 having an elongated slot 51 therein in which permanent magnet 50 is to be inserted. A side of damper inserting part 44 includes a side opening 41 through which latching screw 52 can be contacted with damper 46. Here, a side of damper 46 adjacent side opening 41 has a hole 43 extending from the outside wall of a side of damper 46 to magnet 50 when magnet 50 is inserted into slot 51. The magnetic attractive force of magnet 50 on latching screw 52 is at a maximum through hole 43. Hole 43 is in a planer alignment with latching screw 52, and the diameter of hole 43 is smaller than the diameter of the head of latching screw 52.

Referring now to both FIG. 1 and FIG. 2, the other side of latch assembly 36 includes a plate 37, extending from a bottom part of damper inserting part 44. Plate 37 has a lug inserting hole 38 to receive a lug 32 extending upward from lower yoke 28, and a supporting member passing hole 42 for enabling latch assembly 36 to be attached to lower yoke 28.

Moreover, lower yoke 28 includes the preset size of lug 32 to be inserted into lug inserting hole 38 in latch assembly 36, and a supporting member assembly hole 34 aligned with supporting member passing hole 42 in latch assembly 36 to enable latch assembly 36 to be attached to lower yoke 28.

For securing latch assembly 36 to lower yoke 28, a supporting member 40 is tightly received into supporting member assembly hole 34 in lower yoke 28, through supporting member hole 42 in latch assembly 36. And as shown in FIGS. 1 and 2, supporting member 40 is comprised of a lower portion formed as a peg to be received into supporting member passing hole 42 in latch assembly 36 and into supporting member assembly hole 34 in lower yoke 28, and an upper portion of a larger size than the bottom portion, thereby preventing latch assembly 36 from being rotated around lug 32 when latching screw 52 contacts damper 46.

In a magnetic actuator latching apparatus of hard disk drive 10 according to the present invention constructed as above mentioned, as shown in FIGS. 1 and 2, damper 46 having permanent magnet 50 passes through the upper opening of damper inserting part 44 in latch assembly 36 and then, the one side of damper 46 is disposed at the side opening of the damper inserting part 44. In addition, lug inserting hole 38 in latch assembly 36 is passed over lug 32 in lower yoke 28, and the peg of supporting member 40 passes through supporting member passing hole 42 in latch assembly 36 and is tightly received into supporting member assembly hole 34 in lower yoke 28, thereby rendering latch assembly 36 to be fixed to lower yoke 28.

Referring now to FIGS. 3A and 3B, the first embodiment illustrating the relationship between damper 46 and latching screw 52 is shown. Here, magnet 50 is shown as inserted in damper 46. As latching screw 52 approaches damper 46 and magnet 50, the magnetic pull on latching screw 52 is increased. Damper 46, having permanent magnet 50 inserted therein, is of an appropriate material such as rubber, for example, for buffering a shock or an impact resulting from being contacted with latching screw 52, as shown in FIG. 3B, when the head is parked or moved into the park position, i.e., parking zone, upon a power off condition.

Referring now to FIGS. 4A and 4B, the second embodiment illustrating the relationship between damper 46 and latching screw 52 is shown. Here again, magnet 50 is shown as inserted in damper 46. The second embodiment differs from the first embodiment because a hole 43 is now provided through a side portion of damper 46. As latching screw 52 approaches damper 46 and magnet 50, the magnetic pull on latching screw 52 is increased. The magnetic pull in the second embodiment is greater than the magnetic pull of the first embodiment due to hole 43. Damper 46, having permanent magnet 50 inserted therein, is of an appropriate material such as rubber, for example, for buffering a shock or an impact resulting from being contacted with latching screw 52, as shown in FIG. 4B, when the head is parked or moved into the park position upon a power off condition. Hole 43 is in a planer alignment with latching screw 52, and the diameter of hole 43 is smaller than the diameter of the head of latching screw 52.

ha a preferred embodiment, the walls of damper 46 have a thickness between about 0.3 mm and 0.5 mm. Additionally, the head of latching screw 52 will have a diameter of approximately 3.0 mm, and in the second embodiment, hole 43 will have a diameter between about 1.0 mm and 2.0 mm. Hole 43 in damper 46 creates an air gap between magnet 50 and latching screw 52 through which the magnetic pull of magnet 50 on latching crew 52 is at its maximum.

In the magnetic actuator latching apparatus constructed according to the principles of the present invention, and as shown in FIG. 6, when power, such as an electric signal, is applied in hard disk drive 10 and disk 14 rotates in a given direction by operation of spindle motor 12, magnetic head 24, positioned in parking zone 16 of disk 14, floats up while maintaining a given height by an air flow generated by the rotating surface of disk 14. At this time, latching screw 52 of the actuator, which is in contact with damper 46 at hole 43 by a magnetic force of permanent magnet 50 in latch assembly 36, is separated by a driving force of voice coil motor 21. Then, actuator 20 rotates about a pivot 18, so that magnetic head 24 can be moved into a desired position of data zone 17 of disk 14.

To the contrary, when hard disk drive 10 has its power removed (electrical power is turned off), disk 14 rotates counterclockwise as its rotating speed is reduced by the inertia. Then, magnetic head 24 of actuator 20 is safely positioned on the parking zone located on the inner most portion of the disk 14. At this time, latching screw 52 is latched by permanent magnet 50, thus safely maintaining the non-operation state of hard disk drive 10.

As described above, the magnetic actuator latching apparatus of the hard disk drive constructed according to the principles of the present invention provides such advantages that generation of gas and dust therein is suppressed, since the assembly of the magnetic actuator latching apparatus is possible without having a bond such as an adhesive material, and the cost of production can be lowered by easiness of assembly and separation in comparison with that in using a solenoid or a voice coil motor.

What is claimed is:

1. A magnetic latching apparatus of a hard disk drive having upper and lower yokes accommodating therebetween a voice coil motor located at a voice coil end of an actuator movably mounted to position a magnetic head attached to a head end of the actuator over designated positions of a hard disk, said magnetic latching apparatus comprising:

a latch assembly having a boxed end portion and a plate end portion, said boxed end portion being perforated by an upper opening and a side opening, and said plate end portion being perforated by a lug inserting hole and a supporting member passing hole, said lug inserting hole receiving a lug extending upward from said lower yoke, and said supporting member passing hole being aligned with a support member assembly hole formed in said lower yoke;

a damper having a magnet inserted therein, said damper being inserted through said upper opening of said boxed end portion of said latch assembly with a side portion of said damper being adjacent to said side opening of said boxed end portion of said latch assembly;

said side portion of said damper being perforated by a hole extending through to said magnet;

a support having a peg end for insertion through said supporting member passing hole and fit into said supporting member assembly hole formed for fixedly attaching said latch assembly to said lower yoke; and a latching screw attached to a portion of said voice coil end of said actuator, said latching screw being attracted by a magnetic force of said magnet through said hole in said side portion of said damper, said latching screw contacting said damper and being latched by said magnet when said disk drive is in a power-off operating condition.

2. The magnetic latching apparatus as set forth in claim 1, said portion of said voice coil end of said actuator comprising a threaded groove for receiving said latching screw, said latching screw having a screw thread to be threadingly received into said threaded groove.

3. The magnetic latching apparatus as set forth in claim 1, said damper being comprised of a flexible rubber and having an opening therein for receiving said magnet.

4. The magnetic latching apparatus as set forth in claim 1, said support comprising an upper portion extending above said peg end, said upper portion of said support being larger than said peg end.

5. A magnetic latching apparatus of a hard disk drive, comprising:

upper and lower yokes each having a permanent magnet mounted thereon for accommodating between each said permanent magnet a voice coil motor disposed at a voice coil end of an actuator movably mounted in order to position a magnetic head., attached to a head end of the actuator, over designated positions of a hard disk;

a latch assembly having first and second ends, said latch assembly having a first hole in said second end for accommodating attachment of said latch assembly to said lower yoke;

a damper having a first side portion and a second side portion, said first side portion having a slot therein, said second side portion having a hole therein;

a magnet inserted in said slot of said first portion of said damper, said damper being attached to said first end of said latch assembly;

a support having a small end and a large end, said small end being inserted through a second hole in said second end of said latch assembly to be fixedly attached to said lower yoke; and latching means attached to a portion of said voice coil end of said actuator, said latching means being latched by said magnet while said disk drive is in a parked condition.

6. The magnetic latching apparatus as set forth in claim 5, said first end of said latch assembly comprising a boxed end portion, and said second end of said latch assembly comprising a plate end portion having said first and second holes therein, said boxed end portion having an upper opening and a side opening therein.

7. The magnetic latching apparatus as set forth in claim 6, said first hole in said plate end portion comprising a lug inserting hole, and said second hole in said plate end portion comprising a supporting member passing hole, said lug inserting hole receiving a lug extending upward from said lower yoke for attaching said plate end portion to said lower yoke.

8. The magnetic latching apparatus as set forth in claim 7, wherein said supporting member passing hole is aligned with a support member assembly hole in said lower yoke.

9. The magnetic latching apparatus as set forth in claim 8, said small end of said support comprising a cylindrical peg for passing through said supporting member passing hole and being positioned within said support member assembly hole formed in said lower yoke for fixedly attaching said latch assembly to said lower yoke.

10. The magnetic latching apparatus as set forth in claim 9, said damper being inserted through said upper opening of said boxed end portion of said latch assembly with said second side portion of said damper is adjacent said side opening of said boxed end portion of said latch assembly.

11. The magnetic latching apparatus as set forth in claim 10, said voice coil end of said actuator having a cut away section for exposing a first portion of said voice coil motor and a housing section for housing a second portion of said voice coil motor.

12. The magnetic latching apparatus as set forth in claim 11, a most rearward portion of said housing section of said voice coil end of said actuator having a side section through which said voice coil motor passes, said side section having a threaded groove formed therein.

13. The magnetic latching apparatus as set forth in claim 12, said latching means comprising a latching screw having a threaded end inserted in said threaded groove and a head end, said head end of said latching screw contacting said hole in said second side portion of said damper when said latching screw is latched by said magnet when said disk drive is in a parked condition.

14. The magnetic latching apparatus as set forth in claim 10, said damper being comprised of a flexible rubber.

15. The magnetic latching apparatus as set forth in claim 6, said damper being inserted through said upper opening of said boxed end portion of said latch assembly with said second side portion of said damper being adjacent to said side opening of said boxed end portion of said latch assembly, said damper being comprised of a flexible rubber.

16. The magnetic latching apparatus as set forth in claim 5, said damper being comprised of a flexible rubber.

17. A magnetic latching apparatus of a hard disk drive having upper and lower yokes accommodating therebetween a voice coil motor located at a voice coil end of an actuator movably mounted to position a magnetic head attached to a head end of the actuator over designated positions of a hard disk, said magnetic latching apparatus comprising:

a latch assembly having a boxed end portion and a plate end portion, said boxed end portion having an upper opening and a side opening therein, and said plate end portion having therein a lug inserting hole and a supporting member passing hole, said lug inserting hole accomodating a lug extending upward from said lower yoke, and said supporting member passing hole being aligned with a support member assembly hole formed in said lower yoke;

a damper having a first side portion and a second side portion, said first side portion having an elongated slot therein;

a magnet inserted in said elongated slot of said first side portion of said damper;

said damper, having said magnet inserted therein, being inserted through said upper opening of said boxed end portion of said latch assembly with said second side portion of said damper being adjacent said side opening of said boxed end portion of said latch assembly;

a support having a peg end for insertion through said supporting member passing hole and fit into said support member assembly hole for fixedly attaching said latch assembly to said lower yoke; and a latching screw attached to a portion of said voice coil end of said actuator, said latching screw being attracted by a first magnetic force of said magnet through a wall formed by said second side portion of said damper, said latching screw contacting said damper and being latched by said magnet when said disk drive is in a power off operating condition.

18. The magnetic latching apparatus as set forth in claim 17, said portion of said voice coil end of said actuator comprising a threaded groove for receiving said latching screw, said latching screw having a screw thread to be threadingly received into said threaded groove.

19. The magnetic latching apparatus as set forth in claim 17, said damper being comprised of a flexible robber and having a hole extending through said second side portion to said magnet, said latching screw being attracted by a second magnetic force of said magnet through said hole in said second side portion of said damper, said second magnetic force being greater than said first magnetic force.

20. The magnetic latching apparatus as set forth in claim 19, said hole in said second side portion of said damper having a diameter between about 1.0 millimeters and 2.0 millimeters, said latching screw having a head end of a diameter of about 3.0 millimeters, said head end contacting said hole when said disk drive is in said power off operating condition.

21. The magnetic latching apparatus as set forth in claim 17, said wall having a thickness between about 0.3 millimeters and 0.5 millimeters.

* * * * *